(12) United States Patent
Anderson

(10) Patent No.: US 7,127,641 B1
(45) Date of Patent: Oct. 24, 2006

(54) SYSTEM AND METHOD FOR SOFTWARE TESTING WITH EXTENSIBLE MARKUP LANGUAGE AND EXTENSIBLE STYLESHEET LANGUAGE

(75) Inventor: Doug Anderson, Edmund, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 504 days.

(21) Appl. No.: 10/109,735

(22) Filed: Mar. 29, 2002

(51) Int. Cl.
*G06F 11/00* (2006.01)

(52) U.S. Cl. .......................... 714/38; 714/25; 717/124

(58) Field of Classification Search ................ 714/38, 714/25; 717/115, 124, 126
See application file for complete search history.

(56) References Cited

U.S. PATENT DOCUMENTS

| | | | | |
|---|---|---|---|---|
| 5,905,856 A | * | 5/1999 | Ottensooser | 714/38 |
| 5,960,196 A | * | 9/1999 | Carrier et al. | 717/122 |
| 6,071,316 A | * | 6/2000 | Goossen et al. | 717/126 |
| 6,418,543 B1 | * | 7/2002 | Goli et al. | 714/38 |
| 6,505,342 B1 | * | 1/2003 | Hartmann et al. | 717/104 |
| 6,687,897 B1 | * | 2/2004 | Guinart | 717/143 |
| 6,697,967 B1 | * | 2/2004 | Robertson | 714/43 |
| 6,966,048 B1 | * | 11/2005 | Bowers | 717/101 |
| 2003/0074423 A1 | * | 4/2003 | Mayberry et al. | 709/219 |

OTHER PUBLICATIONS

Refsnes, Jan Egil, Introduction to XSL, No Date Given, XMLFiles.com.*
Microsoft, COM: Component Object Model Technologies, No Date Given.*
Fest, Paul, IE 5.5 bugged in first week, Jul. 14, 2000, Cnet.com.*
Microsoft Press Computer Dictionary, 1997, Microsoft Press, Third Edition, p. 100.*
Extensible Stylesheet Language (XSL) Version 1.0, Oct. 15, 2001, W3C, Section 1.2.*
XSL Transformations (XSLT) Version 1.0, Nov. 16, 1999, W3C, Section 16.2.*
Ocampo, Gerry, SQA Suite 6.1, LoadTest Edition, pp. 1-3.*

* cited by examiner

Primary Examiner—Robert Beausoliel
Assistant Examiner—Marc Duncan

(57) ABSTRACT

A system and method for using Extensible Markup Language (XML) as a scripting language to drive testing of a software program. XML is used to define a markup language in a script that provides commands that are interpreted by a test control processor. The test control processor includes an XML processor for processing the script. Using the script, the test control processor submits instructions to a software program and extracts the behavior of the software program. The software program behavior is tested by submitting multiple sets of instructions and comparing the results. Information regarding the software program behavior and test results is written to an output log file by the test control processor.

21 Claims, 16 Drawing Sheets

```
300S ─── <PSOC_TEST_SUITE>
305S ─── <GENSOC_TEST_LIST>
306 ─── <GENSOC_TEST ATTR_SOCPATH="\GENSOCS" ATTR_UMPATH="\Program Files\Cypress MicroSystems\PSoC Designer\Data"
ATTR_TESTPATH="\GenSOCS\GenSoc.xml" ATTR_COPYROMPATH="\GenROMS" ATTR_B_ASSEMBLY="1" ATTR_B_C="1"
GOLDENROMPATH="\GoldenROMFiles"/>
307S ─── <GENSOC_UM_SPECIAL_HANDLING_LIST>
        308 ─── <GENSOC_UM_SPECIAL_HANDLING UM_NAME="DAC8" EXCLUDE_FUNC="A_DAC8_WriteBlind2B"/>
                <GENSOC_UM_SPECIAL_HANDLING UM_NAME="DAC8" EXCLUDE_FUNC="A_DAC8_WriteStall2B"/>
307E ─── </GENSOC_UM_SPECIAL_HANDLING_LIST>
305E ─── </GENSOC_TEST_LIST>
310S <UM_TEST_LIST>
   311 ─── <UM_TEST INSTANCE_NAME="ADCINC12_0" NUM_NEXTSHAPES="8" NAME="ADCINC12" PATH="\Program Files\Cypress
MicroSystems\PSoC Designer\Data\StdUM"/>
        <UM_TEST INSTANCE_NAME="DELSIG8_1" NUM_NEXTSHAPES="8" NAME="DELSIG8" PATH="\Program Files\Cypress
MicroSystems\PSoC Designer\Data\StdUM"/>
        <UM_TEST INSTANCE_NAME="CMPPRG_2" NUM_NEXTSHAPES="8" NAME="CMPPRG" PATH="\Program Files\Cypress
MicroSystems\PSoC Designer\Data\StdUM"/>
        <UM_TEST INSTANCE_NAME="counter16_3" NUM_NEXTSHAPES="8" NAME="counter16" PATH="\Program Files\Cypress
MicroSystems\PSoC Designer\Data\StdUM"/>
        <UM_TEST INSTANCE_NAME="counter8_4" NUM_NEXTSHAPES="8" NAME="counter8" PATH="\Program Files\Cypress
MicroSystems\PSoC Designer\Data\StdUM"/>
        <UM_TEST INSTANCE_NAME="timer8_5" NUM_NEXTSHAPES="8" NAME="timer8" PATH="\Program Files\Cypress
MicroSystems\PSoC Designer\Data\StdUM"/>
        <UM_TEST INSTANCE_NAME="pwm8_6" NUM_NEXTSHAPES="8" NAME="pwm8" PATH="\Program Files\Cypress
MicroSystems\PSoC Designer\Data\StdUM"/>
        <UM_TEST INSTANCE_NAME="counter24_7" NUM_NEXTSHAPES="8" NAME="counter24" PATH="\Program Files\Cypress
MicroSystems\PSoC Designer\Data\StdUM"/>
        <UM_TEST INSTANCE_NAME="tx8_8" NUM_NEXTSHAPES="8" NAME="tx8" PATH="\Program Files\Cypress MicroSystems\PSoC
Designer\Data\StdUM"/>
        <UM_TEST INSTANCE_NAME="counter32_9" NUM_NEXTSHAPES="8" NAME="counter32" PATH="\Program Files\Cypress
MicroSystems\PSoC Designer\Data\StdUM"/>
        <UM_TEST INSTANCE_NAME="dac6_10" NUM_NEXTSHAPES="8" NAME="dac6" PATH="\Program Files\Cypress
MicroSystems\PSoC Designer\Data\StdUM"/>
        <UM_TEST INSTANCE_NAME="DAC8_11" NUM_NEXTSHAPES="8" NAME="DAC8" PATH="\Program Files\Cypress
MicroSystems\PSoC Designer\Data\StdUM"/>
```

FIGURE 3A

```
<UM_TEST INSTANCE_NAME="INSAMP_12" NUM_NEXTSHAPES="8" NAME="INSAMP" PATH="\Program Files\Cypress MicroSystems\PSoC Designer\Data\StdUM"/>
    <UM_TEST INSTANCE_NAME="PGA_A_13" NUM_NEXTSHAPES="8" NAME="PGA_A" PATH="\Program Files\Cypress MicroSystems\PSoC Designer\Data\StdUM"/>
    <UM_TEST INSTANCE_NAME="LPF2_14" NUM_NEXTSHAPES="8" NAME="LPF2" PATH="\Program Files\Cypress MicroSystems\PSoC Designer\Data\StdUM"/>
    <UM_TEST INSTANCE_NAME="pwm16_15" NUM_NEXTSHAPES="8" NAME="pwm16" PATH="\Program Files\Cypress MicroSystems\PSoC Designer\Data\StdUM"/>
    <UM_TEST INSTANCE_NAME="PWMDB16_16" NUM_NEXTSHAPES="8" NAME="PWMDB16" PATH="\Program Files\Cypress MicroSystems\PSoC Designer\Data\StdUM"/>
    <UM_TEST INSTANCE_NAME="pwmdb8_17" NUM_NEXTSHAPES="8" NAME="pwmdb8" PATH="\Program Files\Cypress MicroSystems\PSoC Designer\Data\StdUM"/>
    <UM_TEST INSTANCE_NAME="rx8_18" NUM_NEXTSHAPES="8" NAME="rx8" PATH="\Program Files\Cypress MicroSystems\PSoC Designer\Data\StdUM"/>
    <UM_TEST INSTANCE_NAME="uart_19" NUM_NEXTSHAPES="8" NAME="uart" PATH="\Program Files\Cypress MicroSystems\PSoC Designer\Data\StdUM"/>
    <UM_TEST INSTANCE_NAME="spim_20" NUM_NEXTSHAPES="8" NAME="spim" PATH="\Program Files\Cypress MicroSystems\PSoC Designer\Data\StdUM"/>
    <UM_TEST INSTANCE_NAME="spis_21" NUM_NEXTSHAPES="8" NAME="spis" PATH="\Program Files\Cypress MicroSystems\PSoC Designer\Data\StdUM"/>
    <UM_TEST INSTANCE_NAME="timer16_22" NUM_NEXTSHAPES="8" NAME="timer16" PATH="\Program Files\Cypress MicroSystems\PSoC Designer\Data\StdUM"/>
    <UM_TEST INSTANCE_NAME="timer24_23" NUM_NEXTSHAPES="8" NAME="timer24" PATH="\Program Files\Cypress MicroSystems\PSoC Designer\Data\StdUM"/>
    <UM_TEST INSTANCE_NAME="timer32_24" NUM_NEXTSHAPES="8" NAME="timer32" PATH="\Program Files\Cypress MicroSystems\PSoC Designer\Data\StdUM"/>
    <UM_TEST INSTANCE_NAME="crc16_25" NUM_NEXTSHAPES="8" NAME="crc16" PATH="\Program Files\Cypress MicroSystems\PSoC Designer\Data\StdUM"/>
    <UM_TEST INSTANCE_NAME="delsig11_26" NUM_NEXTSHAPES="8" NAME="DELSIG11" PATH="\Program Files\Cypress MicroSystems\PSoC Designer\Data\StdUM"/>
    <UM_TEST INSTANCE_NAME="AMPINV_A_27" NUM_NEXTSHAPES="8" NAME="AMPINV_A" PATH="\Program Files\Cypress MicroSystems\PSoC Designer\Data\StdUM"/>
    <UM_TEST INSTANCE_NAME="FlashTemp_28" NUM_NEXTSHAPES="8" NAME="FlashTemp" PATH="\Program Files\Cypress MicroSystems\PSoC Designer\Data\StdUM"/>
    <UM_TEST INSTANCE_NAME="PRS8_29" NUM_NEXTSHAPES="8" NAME="PRS8" PATH="\Program Files\Cypress MicroSystems\PSoC Designer\Data\StdUM"/>
    <UM_TEST INSTANCE_NAME="PRS16_30" NUM_NEXTSHAPES="8" NAME="PRS16" PATH="\Program Files\Cypress MicroSystems\PSoC Designer\Data\StdUM"/>
```

FIGURE 3B

```
<UM_TEST INSTANCE_NAME="PRS24_31" NUM_NEXTSHAPES="8" NAME="PRS24" PATH="\Program Files\Cypress
            MicroSystems\PSoC Designer\Data\StdUM"/>
    <UM_TEST INSTANCE_NAME="PRS32_32" NUM_NEXTSHAPES="8" NAME="PRS32" PATH="\Program Files\Cypress
MicroSystems\PSoC Designer\Data\StdUM"/>
    <PART_TEST NAME="ControlFreak" MAINLANG="1" PROJECT="\ControlProject\ControlProject.soc"/>
310E </UM_TEST_LIST>
315S <PART_TEST_LIST GOLDENROMPATH="\GoldenROMFiles">
   316 <PART_TEST NAME="0" MAINLANG="1" PROJECT="\Program Files\Cypress MicroSystems\PSoC
Designer\Examples\Example_TX9600_28pin\Example_TX9600_28pin.SOC"/>
    <PART_TEST NAME="1" MAINLANG="1" PROJECT="\Program Files\Cypress MicroSystems\PSoC
Designer\Examples\Example_ADC2UART\Example_ADC2UART.SOC"/>
    <PART_TEST NAME="2" MAINLANG="1" PROJECT="\Program Files\Cypress MicroSystems\PSoC
Designer\Examples\Example_ADCINC12_28pin\Example_ADCINC12_28pin.SOC"/>
    <PART_TEST NAME="3" MAINLANG="1" PROJECT="\Program Files\Cypress MicroSystems\PSoC
Designer\Examples\Example_ADCDS8_28pin\Example_ADCDS8_28pin.SOC"/>
    <PART_TEST NAME="4" MAINLANG="1" PROJECT="\Program Files\Cypress MicroSystems\PSoC
Designer\Examples\Example_Counter8_28pin\Example_Counter8_28pin.SOC"/>
    <PART_TEST NAME="5" MAINLANG="1" PROJECT="\Program Files\Cypress MicroSystems\PSoC
Designer\Examples\Example_DAC6_28pin\Example_DAC6_28pin.SOC"/>
    <PART_TEST NAME="6" MAINLANG="1" PROJECT="\Program Files\Cypress MicroSystems\PSoC
Designer\Examples\Example_External_Crystal_28pin\Example_External_Crystal_28pin.SOC"/>
    <PART_TEST NAME="7" MAINLANG="1" PROJECT="\Program Files\Cypress MicroSystems\PSoC
Designer\Examples\Example_PWM_28pin\Example_PWM_28pin.SOC"/>
    <PART_TEST NAME="8" MAINLANG="1" PROJECT="\Program Files\Cypress MicroSystems\PSoC
Designer\Examples\Example_PWM_with_DB_28pin\Example_PWM_with_DB_28pin.SOC"/>
    <PART_TEST NAME="9" MAINLANG="1" PROJECT="\Program Files\Cypress MicroSystems\PSoC
Designer\Examples\Example_UART_RX_Workaround\Example_UART_RX_Workaround.SOC"/>
315E </PART_TEST_LIST>
320S <HTM_TEST_LIST>
320E </HTM_TEST_LIST>
325S <SOCKET_TEST_LIST>
    <SOCKET_TEST NAME="p2smpwr" PORT_NAME="2" NUM_ITERATIONS="10" MODE="1" PATH="\GoldenROMFiles\PWM_20pin.rom" />
326 <SOCKET_TEST NAME="p2smrst" PORT_NAME="2" NUM_ITERATIONS="10" MODE="0" PATH="\GoldenROMFiles\PWM_20pin.rom" />
    <SOCKET_TEST NAME="p2bigpwr" PORT_NAME="2" NUM_ITERATIONS="5" MODE="1" PATH="\GoldenROMFiles\FullFlash20pin.rom" />
```

FIGURE 3C

```xml
        <SOCKET_TEST NAME="p2bigrst" PORT_NAME="2" NUM_ITERATIONS="5" MODE="0"
PATH="\GoldenROMFiles\FullFlash20pin.rom" />
        <SOCKET_TEST NAME="p3smpwr" PORT_NAME="3" NUM_ITERATIONS="10" MODE="1"
PATH="\GoldenROMFiles\Example_PWM_28pin.rom" />
        <SOCKET_TEST NAME="p3smrst" PORT_NAME="3" NUM_ITERATIONS="10" MODE="0"
PATH="\GoldenROMFiles\Example_PWM_28pin.rom" />
        <SOCKET_TEST NAME="p3bigpwr" PORT_NAME="3" NUM_ITERATIONS="5" MODE="1" PATH="\GoldenROMFiles\FullFlash28pin.rom" />
        <SOCKET_TEST NAME="p3bigrst" PORT_NAME="3" NUM_ITERATIONS="5" MODE="0" PATH="\GoldenROMFiles\FullFlash28pin.rom" />
325E </SOCKET_TEST_LIST>
330S <DEBUG_TEST_LIST>
331    <DEBUG_TEST NAME="cgentest_001" PC="01C3" TIMEOUT="10000" PORT="1" STEP="0"
PATH="e:\CompilerTestProjects\cgentests\cgentest_001\cgentest_001.SOC">
        </DEBUG_TEST>
        <DEBUG_TEST NAME="cgentest_002" PC="01C3" TIMEOUT="10000" PORT="1" STEP="0"
PATH="e:\CompilerTestProjects\cgentests\cgentest_002\cgentest_002.SOC">
        </DEBUG_TEST>
        <DEBUG_TEST NAME="cgentest_003" PC="01C3" TIMEOUT="10000" PORT="1" STEP="0"
PATH="e:\CompilerTestProjects\cgentests\cgentest_003\cgentest_003.SOC">
        </DEBUG_TEST>
        <DEBUG_TEST NAME="cgentest_004" PC="01C3" TIMEOUT="10000" PORT="1" STEP="0"
PATH="e:\CompilerTestProjects\cgentests\cgentest_004\cgentest_004.SOC">
        </DEBUG_TEST>
        <DEBUG_TEST NAME="cgentest_005" PC="01C3" TIMEOUT="10000" PORT="1" STEP="0"
PATH="e:\CompilerTestProjects\cgentests\cgentest_005\cgentest_005.SOC">
        </DEBUG_TEST>
        <DEBUG_TEST NAME="cgentest_006" PC="01C3" TIMEOUT="10000" PORT="1" STEP="0"
PATH="e:\CompilerTestProjects\cgentests\cgentest_006\cgentest_006.SOC">
        </DEBUG_TEST>
        <DEBUG_TEST NAME="cgentest_007" PC="01C3" TIMEOUT="10000" PORT="1" STEP="0"
PATH="e:\CompilerTestProjects\cgentests\cgentest_007\cgentest_007.SOC">
        </DEBUG_TEST>
        <DEBUG_TEST NAME="cgentest_008" PC="01C3" TIMEOUT="10000" PORT="1" STEP="0"
PATH="e:\CompilerTestProjects\cgentests\cgentest_008\cgentest_008.SOC">
        </DEBUG_TEST>
```

FIGURE 3D

```
<DEBUG_TEST NAME="cgentest_009" PC="01C3" TIMEOUT="10000" PORT="1" STEP="0"
PATH="e:\CompilerTestProjects\cgentest_009\cgentest_009.SOC">
</DEBUG_TEST>
<DEBUG_TEST NAME="cgentest_010" PC="01C3" TIMEOUT="10000" PORT="1" STEP="0"
PATH="e:\CompilerTestProjects\cgentest_010\cgentest_010.SOC">
</DEBUG_TEST>
<DEBUG_TEST NAME="CompilerTests" PC="01C3" TIMEOUT="10000" PORT="1" STEP="0"
PATH="e:\CompilerTestProjects\CompilerTests\CompilerTests.SOC">
</DEBUG_TEST>
<DEBUG_TEST NAME="fastcall_V2" PC="2018" TIMEOUT="10000" PORT="1" STEP="0"
PATH="e:\CompilerTestProjects\fastcall_V2\fastcall_V2.SOC">
</DEBUG_TEST>
<DEBUG_TEST NAME="dyn_pwm" PC="0ac1" TIMEOUT="30000" PORT="1" STEP="0"
PATH="e:\CompilerTestProjects\Dyn_PWM\Dyn_PWM.SOC">
</DEBUG_TEST>
<DEBUG_TEST NAME="ice_int" PC="0306" TIMEOUT="30000" PORT="1" STEP="0" PATH="e:\InterruptTestProjects\ice_int\ice_int.SOC">
</DEBUG_TEST>
<DEBUG_TEST NAME="Int_ACOL0" PC="02f2" TIMEOUT="30000" PORT="1" STEP="0"
PATH="e:\InterruptTestProjects\Int_ACOL0\Int_ACOL0.SOC">
</DEBUG_TEST>
<DEBUG_TEST NAME="Int_ACOL1" PC="02f5" TIMEOUT="30000" PORT="1" STEP="0"
PATH="e:\InterruptTestProjects\Int_ACOL1\Int_ACOL1.SOC">
</DEBUG_TEST>
<DEBUG_TEST NAME="Int_ACOL2" PC="02f5" TIMEOUT="30000" PORT="1" STEP="0"
PATH="e:\InterruptTestProjects\Int_ACOL2\Int_ACOL2.SOC">
</DEBUG_TEST>
<DEBUG_TEST NAME="Int_ACOL3" PC="02f5" TIMEOUT="30000" PORT="1" STEP="0"
PATH="e:\InterruptTestProjects\Int_ACOL3\Int_ACOL3.SOC">
</DEBUG_TEST>
<DEBUG_TEST NAME="Int_DBA0" PC="01b0" TIMEOUT="30000" PORT="1" STEP="0"
PATH="e:\InterruptTestProjects\Int_DBA0\Int_DBA0.SOC">
</DEBUG_TEST>
<DEBUG_TEST NAME="Int_DBA1" PC="01b0" TIMEOUT="30000" PORT="1" STEP="0"
PATH="e:\InterruptTestProjects\Int_DBA1\Int_DBA1.SOC">
</DEBUG_TEST>
```

FIGURE 3E

```
            <DEBUG_TEST NAME="Int_DBA2" PC="01b0" TIMEOUT="30000" PORT="1" STEP="0"
PATH="e:\InterruptTestProjects\Int_DBA2\Int_DBA2.SOC">
            </DEBUG_TEST>
            <DEBUG_TEST NAME="Int_DBA3" PC="01b0" TIMEOUT="30000" PORT="1" STEP="0"
PATH="e:\InterruptTestProjects\Int_DBA3\Int_DBA3.SOC">
            </DEBUG_TEST>
            <DEBUG_TEST NAME="Int_DCA4" PC="01b0" TIMEOUT="30000" PORT="1" STEP="0"
PATH="e:\InterruptTestProjects\Int_DCA4\Int_DCA4.SOC">
            </DEBUG_TEST>
            <DEBUG_TEST NAME="Int_DCA5" PC="01b0" TIMEOUT="30000" PORT="1" STEP="0"
PATH="e:\InterruptTestProjects\Int_DCA5\Int_DCA5.SOC">
            </DEBUG_TEST>
            <DEBUG_TEST NAME="Int_DCA6" PC="01b0" TIMEOUT="30000" PORT="1" STEP="0"
PATH="e:\InterruptTestProjects\Int_DCA6\Int_DCA6.SOC">
            </DEBUG_TEST>
            <DEBUG_TEST NAME="Int_DCA7" PC="01b0" TIMEOUT="30000" PORT="1" STEP="0"
PATH="e:\InterruptTestProjects\Int_DCA7\Int_DCA7.SOC">
            </DEBUG_TEST>
            <DEBUG_TEST NAME="Int_GPIO" PC="01c6" TIMEOUT="30000" PORT="1" STEP="0"
PATH="e:\InterruptTestProjects\Int_GPIO\Int_GPIO.SOC">
            </DEBUG_TEST>
330E⟶</DEBUG_TEST_LIST>
300E⟶</PSOC_TEST_SUITE>
```

FIGURE 3F

400 — `<INST NAME="Select UserModule" ARG="ADCINC12, ADCINC12_0" ERRTEXT="OK" ERRCODE="0x0 [0]"/>`
405 — `<INST NAME="PlaceUserModule" ARG="ADCINC12_0" ERRTEXT="OK" ERRCODE="0x0 [0]"/>`
410 — `<INST NAME="Get Parameter Names" ARG="ADCINC12_0" ERRTEXT="OK" ERRCODE="0x0 [0]"/>`
415 — `<INST NAME="Get Parameter Values" ARG="ADCINC12_0" ERRTEXT="OK" ERRCODE="0x0 [0]"/>`

`<INST NAME="SetUserModuleParameter" ARG="ADCINC12_0 TMR Clock DBA03" ERRTEXT="OK" ERRCODE="0x0 [0]"/>`
`<INST NAME="SetUserModuleParameter" ARG="ADCINC12_0 TMR Clock Previous" ERRTEXT="OK" ERRCODE="0x0 [0]"/>`
`<INST NAME="SetUserModuleParameter" ARG="ADCINC12_0 TMR Clock 48M" ERRTEXT="OK" ERRCODE="0x0 [0]"/>`
`<INST NAME="SetUserModuleParameter" ARG="ADCINC12_0 TMR Clock 24V1" ERRTEXT="OK" ERRCODE="0x0 [0]"/>`
`<INST NAME="SetUserModuleParameter" ARG="ADCINC12_0 TMR Clock 24V2" ERRTEXT="OK" ERRCODE="0x0 [0]"/>`
`<INST NAME="SetUserModuleParameter" ARG="ADCINC12_0 TMR Clock CPU_32_KHz" ERRTEXT="OK" ERRCODE="0x0 [0]"/>`
`<INST NAME="SetUserModuleParameter" ARG="ADCINC12_0 TMR Clock Global_OUT_0" ERRTEXT="OK" ERRCODE="0x0 [0]"/>`
`<INST NAME="SetUserModuleParameter" ARG="ADCINC12_0 TMR Clock Global_OUT_1" ERRTEXT="OK" ERRCODE="0x0 [0]"/>`
`<INST NAME="SetUserModuleParameter" ARG="ADCINC12_0 TMR Clock Global_OUT_2" ERRTEXT="OK" ERRCODE="0x0 [0]"/>`
`<INST NAME="SetUserModuleParameter" ARG="ADCINC12_0 TMR Clock Global_OUT_3" ERRTEXT="OK" ERRCODE="0x0 [0]"/>`
`<INST NAME="SetUserModuleParameter" ARG="ADCINC12_0 TMR Clock Global_OUT_4" ERRTEXT="OK" ERRCODE="0x0 [0]"/>`
`<INST NAME="SetUserModuleParameter" ARG="ADCINC12_0 TMR Clock Global_IN_0" ERRTEXT="OK" ERRCODE="0x0 [0]"/>`
`<INST NAME="SetUserModuleParameter" ARG="ADCINC12_0 TMR Clock Global_IN_1" ERRTEXT="OK" ERRCODE="0x0 [0]"/>`
`<INST NAME="SetUserModuleParameter" ARG="ADCINC12_0 TMR Clock Global_IN_2" ERRTEXT="OK" ERRCODE="0x0 [0]"/>`
`<INST NAME="SetUserModuleParameter" ARG="ADCINC12_0 TMR Clock Global_IN_3" ERRTEXT="OK" ERRCODE="0x0 [0]"/>`
`<INST NAME="SetUserModuleParameter" ARG="ADCINC12_0 TMR Clock Disable" ERRTEXT="OK" ERRCODE="0x0 [0]"/>`
420

430 — `<INST NAME="Generate Source" ARG="" ERRTEXT="OK" ERRCODE="0x0 [0]"/>`
435 — `<INST NAME="NextShape" ARG="ADCINC12_0" ERRTEXT="OK" ERRCODE="0x0 [0]"/>`
440 — `<INST NAME="PlaceUserModule" ARG="ADCINC12_0" ERRTEXT="OK" ERRCODE="0x0 [0]"/>`
445 — `<INST NAME="Get Parameter Names" ARG="ADCINC12_0" ERRTEXT="OK" ERRCODE="0x0 [0]"/>`
450 — `<INST NAME="Get Parameter Values" ARG="TMR Clock" ERRTEXT="OK" ERRCODE="0x0 [0]"/>`

FIGURE 4

501 — 3 ---BEGIN CREATING PROJECT TESTS---84 Tests          500

505 {
    4
    5 ------Initiating Part Test 0 of 84-------[0]-
    6 \GENSOCS\A_ADCINC12\A_ADCINC12.SOC
    7 Open Project(E:\GENSOCS\A_ADCINC12\A_ADCINC12.SOC, 1)
    8 OK
    9 SelectUserModule
    10 OK
    11 PlaceUserModule
    12 OK
    13 Generate Source;
    14 OK
    15 BuildAll
    16 OK
    17 CompareROMFile
    18 OK
    19 Close Project()
    20 OK
    21
    .
    .
    .

510 {
    1421 ------Initiating Part Test 83 of 84-------[83]-
    1422 \GENSOCS\C_LPF2\C_LPF2.SOC
    1423 Open Project(E:\GENSOCS\C_LPF2\C_LPF2.SOC, 0)
    1424 OK
    1425 SelectUserModulE
    1426 OK
    1427 PlaceUserModule
    1428 OK
    1429 Generate Source;
    1430 OK
    1431 BuildAll
    1432 OK
    1433 CompareROMFile
    1434 ERROR code 80070057
    1435 Subsystem: Windows System: The parameter is incorrect.
    1436 Close Project()
    1437 OK
    1438

515 — 1439 ---END PROJECT TESTS ---

FIGURE 5

SYSTEM AND METHOD FOR SOFTWARE TESTING WITH EXTENSIBLE MARKUP LANGUAGE AND EXTENSIBLE STYLESHEET LANGUAGE

FIELD OF THE INVENTION

Embodiments of the present invention relate to the field of software testing. More particularly, embodiments of the present invention relate to a system and method for using Extensible Markup Language as scripting language, and Extensible Stylesheet Language (XSL) stylesheets to drive a software test.

BACKGROUND ART

Generally, the speed of execution of interactive programs is largely limited by the rate at which a user inputs data and commands, and not by the execution of the commands by the system on which the software is running. At the user level, macro commands and scripts may be used to increase the speed of execution of tasks that involve many commands.

For large or frequently used command sequences, scripts may be used in conjunction with a scripting engine that interprets the script and controls the execution of a program. For example, a web browser may have a scripting engine using JAVASCRIPT or VBSCRIPT (JAVASCRIPT is a registered trademark of Sun Microsystems Inc. Palo Alto, Calif.). Scripting engines are usually associated with a particular language that is a programming language or a subset of a programming language.

One area in which scripts are particularly useful is in the testing of software programs. Thorough testing of a software program typically requires the repeated application of large sets of commands.

Although a script and scripting engine based upon a particular programming language may mesh well with a program that is written in the same programming language, the content of the script may be difficult to associate with the commands that a user would input to the program, such as menu selections made from a graphical user interface. In this case, the script writing requires a level of familiarity with the code underlying the graphical user interface. The user interface of a software application is usually tailored towards natural language. Commands such as "cut" and "paste" are descriptive of their actions even though the executable source code is not.

A markup language such as Extensible Markup Language (XML) is not a programming language per se, but combines text and information concerning the text in a document that may be used by another program. Markup languages are less abstract and bear a closer resemblance to natural language than programming languages, and thus have the potential to be more user friendly.

SUMMARY OF INVENTION

Accordingly, embodiments of the present invention provide a system and method for software testing that use a markup language as a scripting language. Extensible Markup Language (XML), including Extensible Stylesheet Language (XSL) stylesheets are used to define a new markup language for developing scripts that can be used by a test control processor to test another software program.

A system and method for using Extensible Markup Language (XML) as a scripting language to drive testing of a software program are disclosed. XML is used to define a markup language in a script that provides commands that are interpreted by a test control processor. The test control processor may include an XML processor for processing the script. Using the script, the test control processor submits instructions to a software program and extracts the behavior of the software program. The software program behavior is tested by submitting multiple sets of instructions and comparing the results. Information regarding the software program behavior and test results is written to an output log file by the test control processor.

In one embodiment, an automation interface may be employed between the tester system and the application to be tested. In another embodiment, the application to be tested may be an integrated design environment program providing graphical user interfaces for the implementation of a design on a programmable device, such as a microcontroller. In this embodiment, an output of the application is a ROM image file that may be compared against a known file.

The tester can be pointed to a project in which case the test is run on the project to generate the ROM image file used to program the circuit device. In another embodiment, the tool can be directed to a library of user modules. The results generated by the application in this case would be assembly and C language projects for each user module. A ROM image file may also be generated.

BRIEF DESCRIPTION OF THE DRAWINGS

FIGS. 3A, 3B, 3C, 3D, 3E, and 3F show an example of an XML formatted script in accordance with an embodiment of the present claimed invention.

FIG. 4 shows an example of portions of an HTML formatted output log file in accordance with an embodiment of the present claimed invention.

FIG. 5 shows an example of portions of an HTML formatted output log file in accordance with an embodiment of the present claimed invention.

DESCRIPTION OF THE PREFERRED EMBODIMENTS

In the following detailed description of the present invention, a system and method for software testing with Extensible Markup; numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

NOTATION AND NOMENCLATURE

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. A procedure, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the disclosure of the present invention, terms such as "processing" or "computing" or "calculating" or "computing" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's registers or memories or other such information storage, transmission or display devices.

Figure 1A:
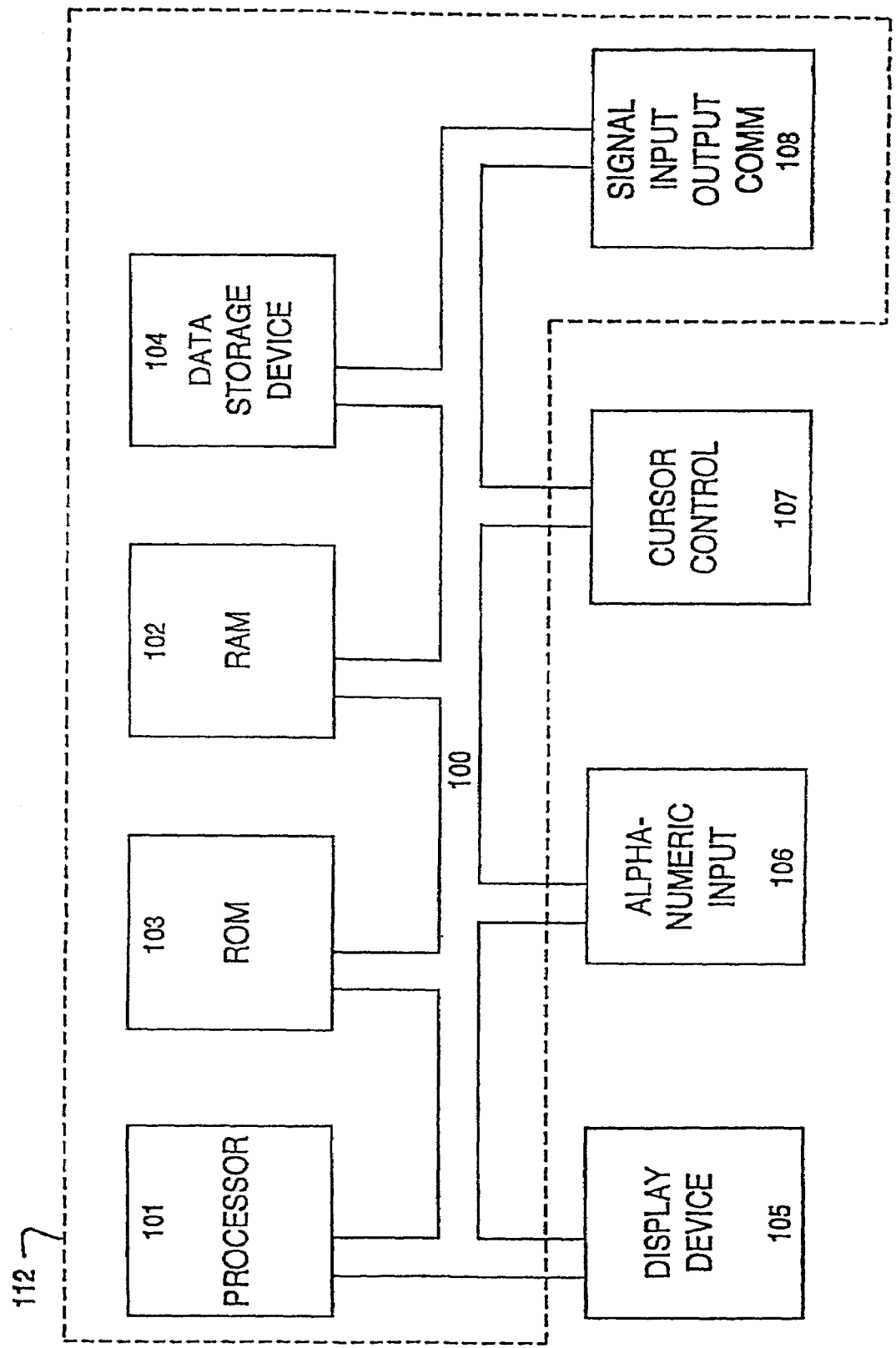
FIG. 1A is a diagram of a computer system portion of an environment in which embodiments of the present claimed invention may be practiced.

Refer to FIG. 1A which illustrates a computer system 112. In general, computer systems 112 used by the preferred embodiment of the present invention comprise a bus 100 for communicating information, a central processor 101 coupled with the bus for processing information and instructions, a random access memory 102 coupled with the bus 100 for storing information and instructions for the central processor 101, a read only memory 103 coupled with the bus 100 for storing static information and instructions for the processor 101, a data storage device 104 such as a magnetic or optical disk and disk drive coupled with the bus 100 for storing information and instructions, a display device 105 coupled to the bus 100 for displaying information to the computer user, an alphanumeric input device 106 including alphanumeric and function keys coupled to the bus 100 for communicating user input information and command selections to the central processor 101, cursor control device 107 coupled to the bus for communicating user input information and command selections to the central processor 101, and a communications port 108 coupled to the bus 100 communication with the system 112. The port 108 may be coupled to printer.

The display device 105 of FIG. 1A utilized with the computer system of the present invention may be a liquid crystal device, cathode ray tube or other display device suitable for creating graphic images and alphanumeric characters recognizable to the user. The cursor control device 107 allows the computer user to dynamically signal the two dimensional movement of a visible symbol (pointer) on a display screen of the display device 105. Many implementations of the cursor control device are known in the art including a trackball, mouse, joystick or special keys on the alphanumeric input device 105 capable of signaling movement of a given direction or manner of displacement. It is to be appreciated that the cursor means 107 also may be directed and/or activated via input from the keyboard using special keys and key sequence commands. Alternatively, the cursor may be directed and/or activated via input from a number of specially adapted cursor directing devices.

The computer system 112 of FIG. 1A may be used with an integrated design environment (IDE). An example of an IDE is PSOC DESIGNER software, available from Cypress MicroSystems, Inc., of Bothell, Wash. PSOC DESIGNER software contains three subsystems; a DEVICE EDITOR subsystem, an Application Editor subsystem, and a Debugger subsystem. The interface is split into several active windows that differ depending on which subsystem the user is in. The PSOC DESIGNER software is an example of a program with a graphical user interface that may be automated and tested in an embodiment of the present invention.

The advent of programmable integrated circuits and computer-aided design (CAD) tools has reduced the number of individuals required to carry a concept from design to productization. The development of the integrated design environment (IDE) has made it possible for individual engineers to configure a programmable integrated circuit.

The IDE has made it feasible for a single designer to configure sophisticated integrated circuits with dozens of pins and many possible inputs and outputs. An example of such integrated circuits is the programmable microcontroller. A programmable microcontroller may include a microprocessor, memory, and digital and other programmable hardware resources.

Figure 1B:
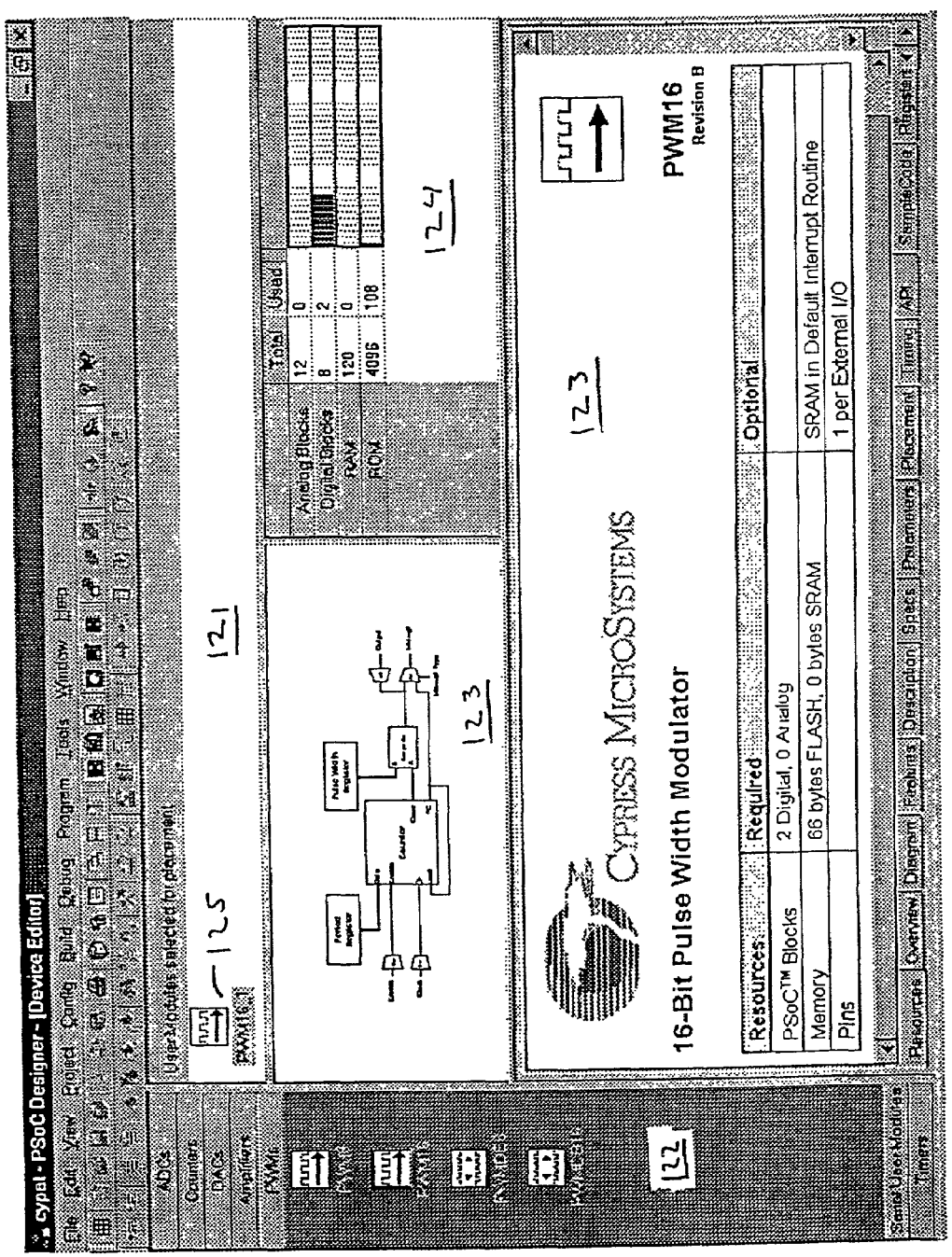
FIG. 1B shows a device editor window of an integrated design environment used for user module selection in accordance with an embodiment of the present claimed invention.

The PSOC DESIGNER DEVICE EDITOR subsystem of FIG. 1B is used for selection, placement and configuration of User Modules. FIG. 1B shows a DEVICE EDITOR interface 120 in selection mode. Shown in FIG. 1B are a User Module Selection Window 121, User Module Window 122, User Information Windows 123, and a Resource Manager Window 124.

An example of an integrated circuit that can be configured using PSOC DESIGNER software is the Cypress MicroSystems CY8C25122A microcontroller. The CY8C25122A is a member of the CY8C25xxx/26xxx family of PSOC™ microcontrollers that replaces many MCU-based system components with one single-chip, programmable device. A single PSOC microcontroller offers a fast core, Flash program memory, and SRAM data memory with configurable analog and digital peripheral blocks in a range of convenient pin-outs and memory sizes. The driving force behind this innovative integrated circuit comes from user configurability of analog and digital arrays of programmable system blocks. The programmable system blocks are analog and digital peripheral blocks that may be customized by the placement and configuration of User Modules.

The interface 120 is used to configure the target device. User Modules (represented by icons) may be selected from the User Module Window 122, which causes an icon to appear in the User Module Selection window 121. In this example a pulse width modulator PWM16_1 125 is shown as selected. Information regarding the PWM16_1 125 is shown in the User Information Windows 123. The Resource Manager Window shows the target device resources that are used by the PWM 16_1.

Figure 1C:
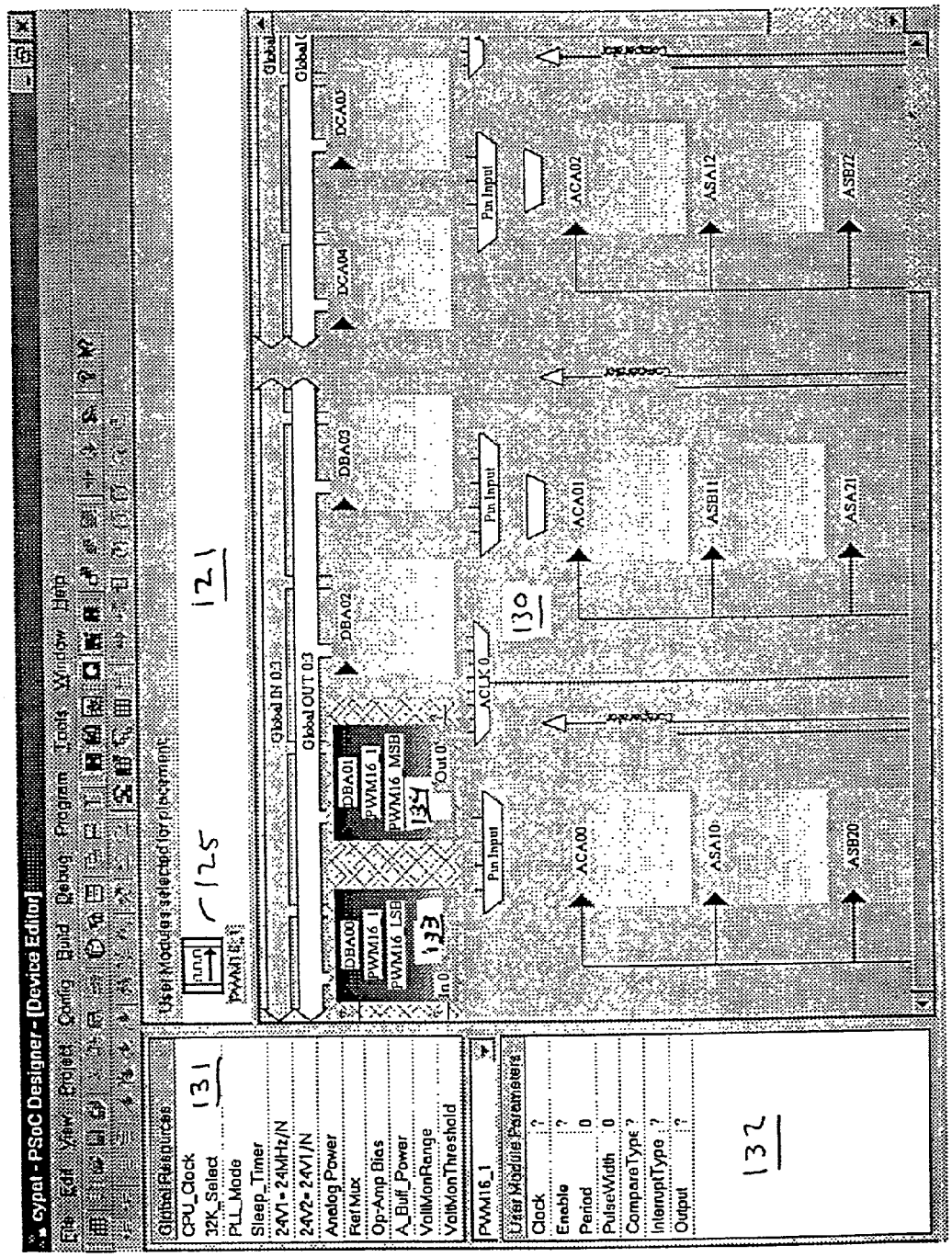
FIG. 1C shows a device editor window of an integrated design environment used for user module placement in accordance with an embodiment of the present claimed invention.

FIG. 1C shows the interface 120 in placement mode, with a Placement Window 130, a Global Resources Window 131, and a User Module Parameters Window 132. User Modules shown in the User Module Selection window 121 are placed in the Placement Window 130. The placement of the PWM 16_1 125 is indicated by the two digital blocks 133 and 134 shown in the Placement Window 130. Parameters and resources shown in the Global Resources Window 131 and User Module Parameters Window 132 are available for configuration by the designer.

Figure 1D:
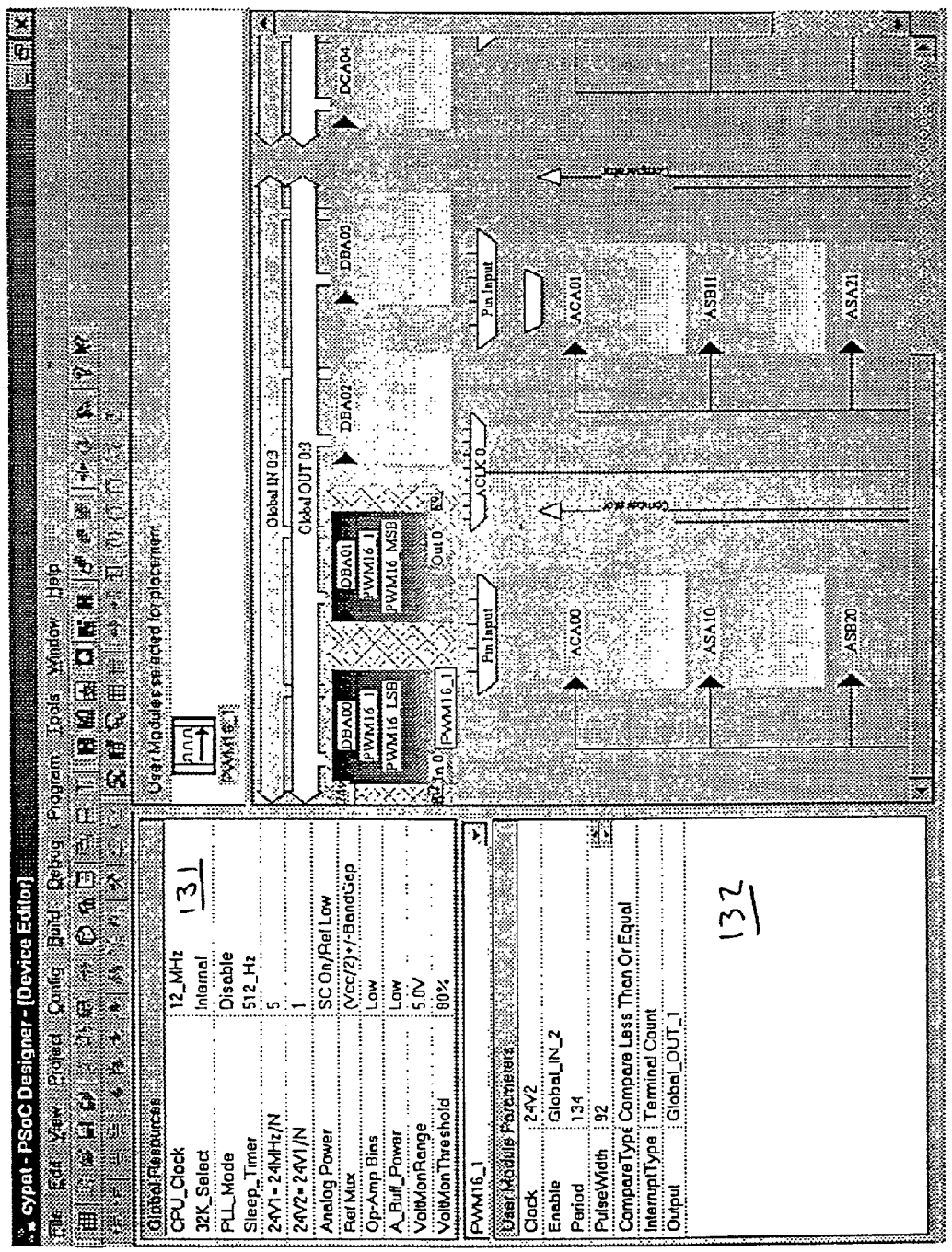
FIG. 1D shows integrated design environment window used for specification of module parameters and global resources in accordance with an embodiment of the present claimed invention.

FIG. 1D shows the interface 120 with expanded Global Resources Window 131 and User Module Parameter Window in which resources and parameters have been set. For example, in the Global Resources Window 131, the CPU_Clock has been set with a frequency of 12 MHz and the Sleep Timer has been set with a frequency of 512 Hz. In the User Module Parameters Window the period has been set at 134 and the Pulse Width has been set at 92.

Figure 1E:
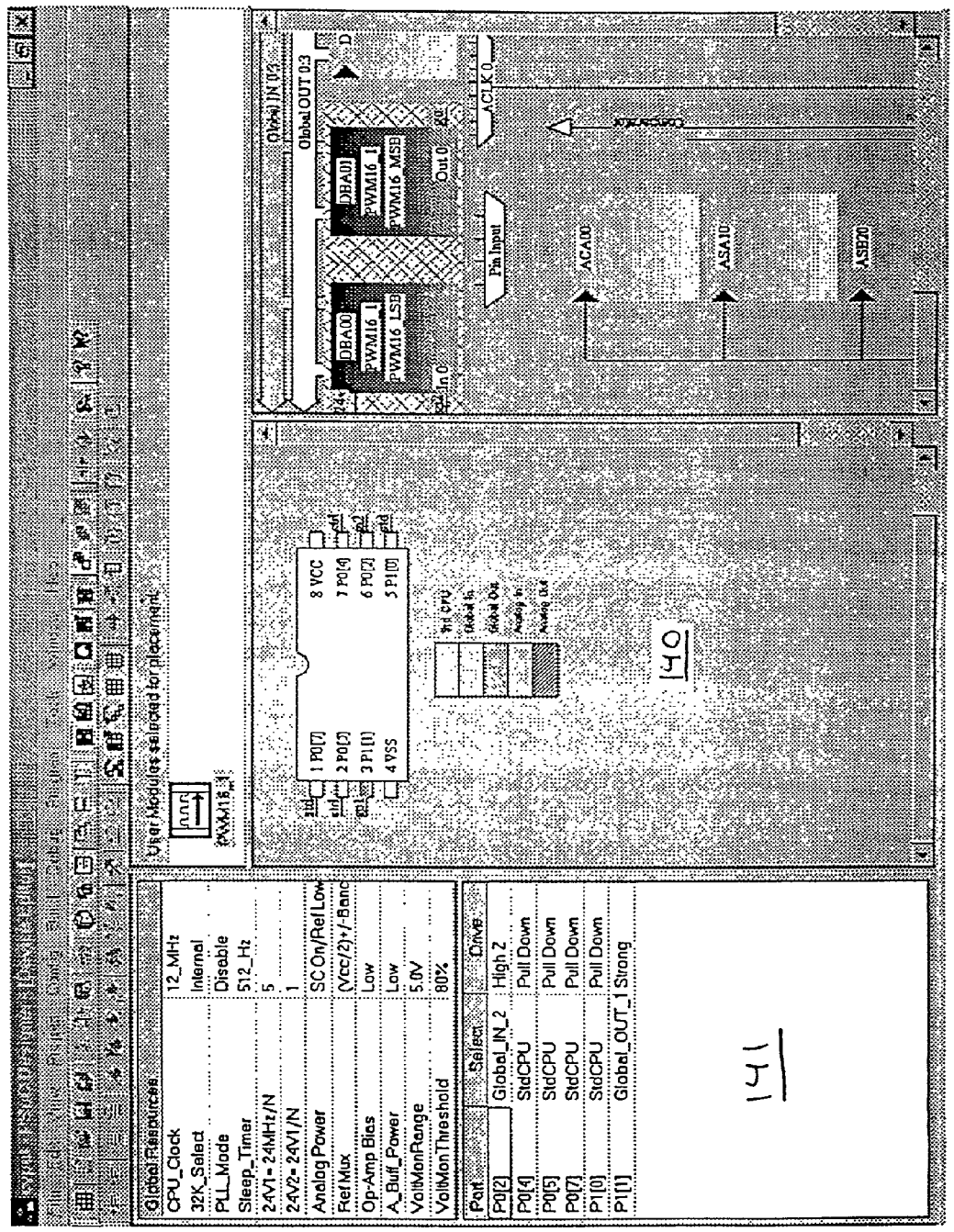
FIG. 1E shows a window of an integrated design environment used for specifying device pinout in accordance with an embodiment of the present claimed invention.

FIG. 1E shows a configuration interface of an integrated design environment used for deploying module connections. Interconnections can be specified on the device in the placement mode of the interface. User Module interconnections consist of connections to surrounding configurable blocks, output bus, input bus, internal system clocks and references, external pins, and analog output buffers. Multiplexors may also be configured to route signals throughout the configurable block architecture.

Referring again to FIG. 1E, a Pinout Window 140 and a Pinout Parameters Window 141 are shown. The Pinout window includes a diagram of the pin layout of the target device (e.g., the Cypress MicroSystems CY8C25122A). The Pinout Window accepts input specifying the connections for the configurable blocks to the pins. In this example, there is only one User Module present, and thus there are no interconnections specified between multiple User Modules. Typically, there may be multiple User Modules with designer specified interconnects which would be stored in the project database. Some interconnects are designer specified, whereas others are generated automatically (e.g., the interconnection of blocks of a selected User Module).

Further details regarding integrated circuits that are configurable from within an integrated design environment are described in a U.S. patent application titled "Programmable Microcontroller Architecture."by W. Snyder, filed on Oct. 22, 2001; the whole of which is incorporated herein by reference. Additionally, an integrated design environment in or with which the present invention may be practiced is described in U.S. patent applications Ser. No. 09/972,003 (filed Oct. 5, 2001), Ser. No. 09/972,133 (filed Oct. 5, 2001), and Ser. No. 09/998,848 (filed Nov. 15, 2001); which are incorporated herein by reference.

Generally, Extensible Markup Language (XML) can be used as a human-readable, machine-understandable, general syntax for describing hierarchical data. XML documents are made up of storage units called entities, which contain either parsed or unparsed data. Parsed data is made up of characters, some of which form the character data in the document, and some of which form markup. Markup encodes a description of the document's storage layout and logical structure. XML provides a mechanism to impose constraints on the storage layout and logical structure. A software module called an XML processor is used to read XML documents and provide access to their content and structure.

Unlike HTML, element names in XML have no intrinsic presentation semantics. Extensible Stylesheet Language (XSL) is used to prepare stylesheets to handle presentation of XML data. XSL is capable of transforming XML to HTML.

Figure 2A:
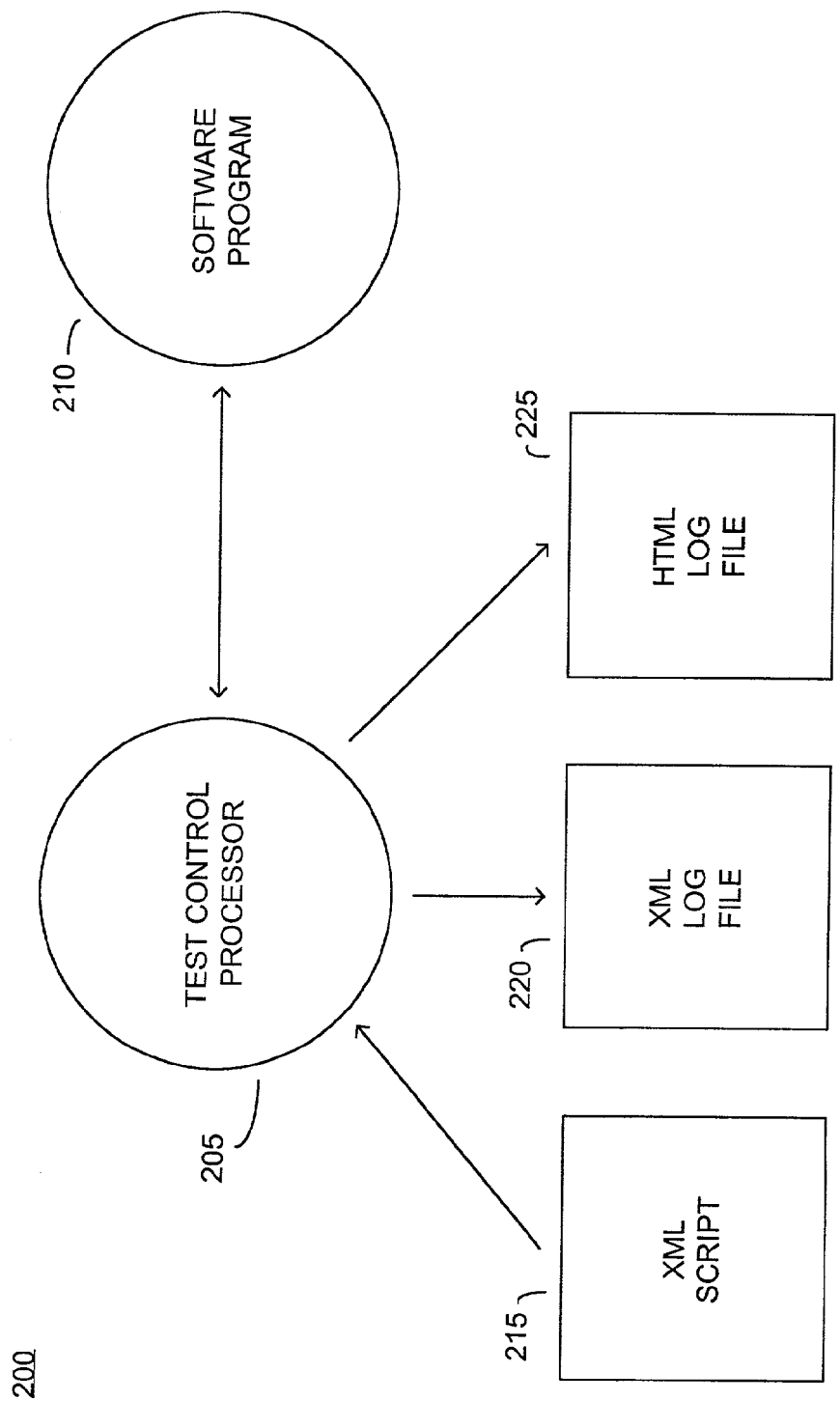
FIG. 2A shows a general system for testing a software program using XML as a scripting language in accordance with an embodiment of the present claimed invention.

FIG. 2A shows a general computer implemented system 200 for testing a software program 210 using an XML script 215 that includes data that serves as commands for the test control processor 205, and also data for input to the software program 210. The test control processor 215 includes an XML processing capability and is used to process the XML script 215 to produce a set of instructions that are executed by the software program 210. The test control processor 205 functions at two levels.

On the first level, the test control processor controls the execution of the software program by issuing instructions and arguments or data to the software program. This control may be exercised through an interface such as a Component Object Model (COM) interface. COM is a software architecture that allows the components made by different vendors to be combined into a variety of applications. COM defines a standard for interoperability and is not dependent on any particular programming language. COM provides mechanisms for communications between components, error and status reporting, and dynamic loading of components. The COM interface may be included in the software program 210 in order to achieve automation.

On the second level, the test control processor extracts the behavior of the software program by evaluating its output and comparing the output to standard references or expected results. The overall process of testing the software program 210 thus comprises the execution of the software program at the first level, and extraction of the behavior of the software program at the second level.

The results of the testing of the software program may be written to output log file 220 in an XML format, or may be written to output log file 225 in an HTML format. The XML format is convenient for storing results for subsequent access by a program that has an XML processing capability. The HTML format is useful for dissemination of results as it is accessible by a web browser.

Figure 2B:
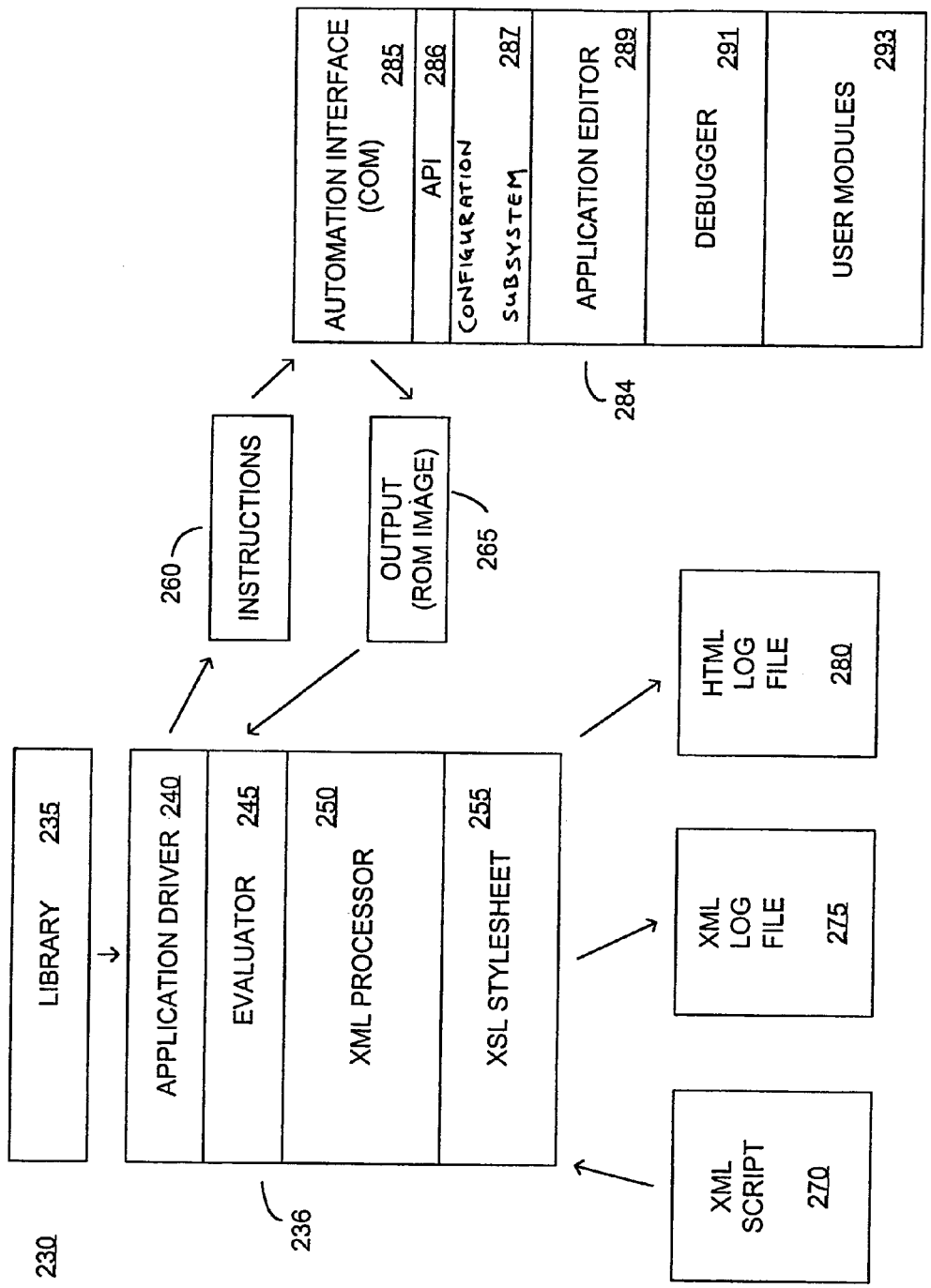
FIG. 2B shows a system for testing an integrated design environment for a programmable microcontroller using XML as a scripting language in accordance with an embodiment of the present claimed invention.

FIG. 2B shows a system 230 for testing an integrated design environment 284. The integrated design environment includes a configuration subsystem 287, a Debugger subsystem 291, an Application Editor subsystem 289, and User Modules 293. The integrated design environment also includes a COM Automation Interface 285 that accepts instructions 260 from the test control processor 236.

The instructions 260 are prepared by the application driver 240 using the XML script 270. The XML script is interpreted by the XML processor 250 and the results made available to the application driver 240. The XML Script may include pointers to a Library 235 for data and other files that may be incorporated into the instructions 236 by the application driver 240.

Output 265 from the integrated design environment 284 may include a ROM image and/or error and status messages generated by the integrated design environment 284. The Output 265 is passed to an Evaluator that compares the output (e.g., a ROM file) to expected results that may be stored in the Library 235. The Evaluator may also process error messages and status messages.

The execution history of the integrated design environment software, the instructions 260, and the results produced by the Evaluator 245 may be captured in an XML log file 275 or an HTML log file 280. The test control processor may include an XSL stylesheet 255 to format the output log files.

FIGS. 3A, 3B, 3C, 3D, 3E, and 3F show an example of an XML formatted script 215 used for testing the software program in accordance with an embodiment of the present claimed invention. A Test Suite, defined by start tag 300S in FIG. 3A and end tag 300E in FIG. 3F, is the root element of the script. Elements nested with the root element contain instructions for the test control processor 205 and data for the software program. The script may include elements for any of the commands that a user would enter from a graphical user interface (GUI) or command line associated with the application.

The Test Suite defined by start tag 300S in FIG. 3A and end tag 300E in FIG. 3F, may be used to test the functionality of the software program in its entirety, or it may tailored to focus on specific functions. Due to the large amount of time required to test large programs, it is desirable to be able to do focused partial testing of particular parts of a large program. During the long term development of complex programs in which the test focus is constantly changing and test scripts must be constantly revised, the use of XML as a scripting language reduces the overall effort for testing.

The GENSOC_TEST_LIST defined by start tag 305S and end tag 305E is an element containing a class of comprehensive tests. Shown within GENSOC_TEST_LIST is a specific test defined by the empty element tag 306. Attributes within tag 306 provide the test control processor with locations of files necessary for execution control (e.g., GenSoc.xml), and data for the software program. The test creates assembly and C language projects for each User Module and makes a call to every Application Program Interface (API). The test also generates a ROM file that is compared to a reference ROM file (GoldenROMfile).

The GENSOC_UM_SPECIAL_HANDLING_LIST defined by start tag 307S and end tag 307E is an element containing a class of modifications to the basic GENSOC_TEST of element 306. Elements with in this class, such as element 308, can modify the basic test by excluding specific test operations.

The UM_TEST_LIST defined by start tag 310S in FIG. 3A and end tag 310E in FIG. 3C, is an element containing a class of tests directed to individual User Modules within the software program. For example, element 311 is a test directed to an A/D converter "ADCINC12_0."

Start tag 315S and end tag 315E in FIG. 3C define a class of tests directed to projects within the software program. FIG. 3C also shows an HTM_TEST_LIST defined by start tag 320S and end tag 320E. In this particular example, the element is empty and HTM tests are not applied. The SOCKET_TEST_LIST element defined by start tag 325S in FIG. 3C and end tag 325E in FIG. 3D, and the DEBUG_TEST_LIST defined by start tag 330S in FIG. 3D and end tag 330E in FIG. 3F contain additional classes of tests that may be applied to the software program.

In testing the software program, an object that is evaluated for success or failure is the ROM file. The ROM file is a binary image that is used to program the non-volatile memory (e.g., ROM) in a programmable microcontroller as described above. Output ROM files produced by the software program during testing are compared to known valid ROM files. When a discrepancy is observed, the output ROM file the execution behavior of the software program is examined to determine the cause, and/or the output ROM file is verified.

A discrepancy may be caused by a defect in the software program, such as an error during the build process. In this case, the software program or project associated with the ROM file is debugged. Alternatively, the output ROM file may be verified by testing independent of the software program with respect to its intended use to determine correct functionality. When such a ROM file is independently verified, it may itself be adopted as a reference for subsequent tests, augmenting or replacing existing reference ROM files.

FIG. 4 shows an example of portions of an XML formatted output log file in accordance with an embodiment of the present claimed invention. Element 400 reports the success or failure of selecting a user module, in this case, an A/D converter (ADCINC12_0). Element 405 reports the success or failure of placing the User Module. Element 410 reports the success or failure of accessing a parameter list for the A/D converter, and element 415 reports the success or failure of selecting a parameter from the list, in this case the TMR Clock parameter. The element block 420 shows the results for the selection of parameter values for the TMR Clock.

Each User Module may tested using a combination of placement, parameter selection, and parameter values in the manner shown above for the A/D converter. Element 430 reports the success or failure of the source code generation for a User Module configuration.

Element 435 reports on the success or failure of another placement of the User Module, selected from the possible placements. Elements 440, 445, and 450 report results similar to elements 405, 410, and 415, for the new placement. The example of FIG. 4 illustrates how complex the testing of the software program can be when all User Modules, placement options, parameters, parameters, and source code generation are taken into account. The use of an XML formatted output log file is an efficient way to manage the collection and presentation of the large amount of output data produced by testing. XSL stylesheets provide many options for rendering visible output of the data for examination.

FIG. 5 shows an example of portions of an HTML formatted output log file as rendered by a browser. The HTML output log file may be used to provide test results in a format that is close to natural language. The header 501 indicates the type of test results being reported, in this case, the results of 84 project tests. Block 505 having lines 4 through 21 shows the successful results for a project test related to an A/D converter.

Block 510 of FIG. 5 having lines 1421 through 1438, shows the report for the test of another User Module in which an error is reported at lines 1434 and 1435. Label 515 indicates the end of the project test report block.

Figure 6:
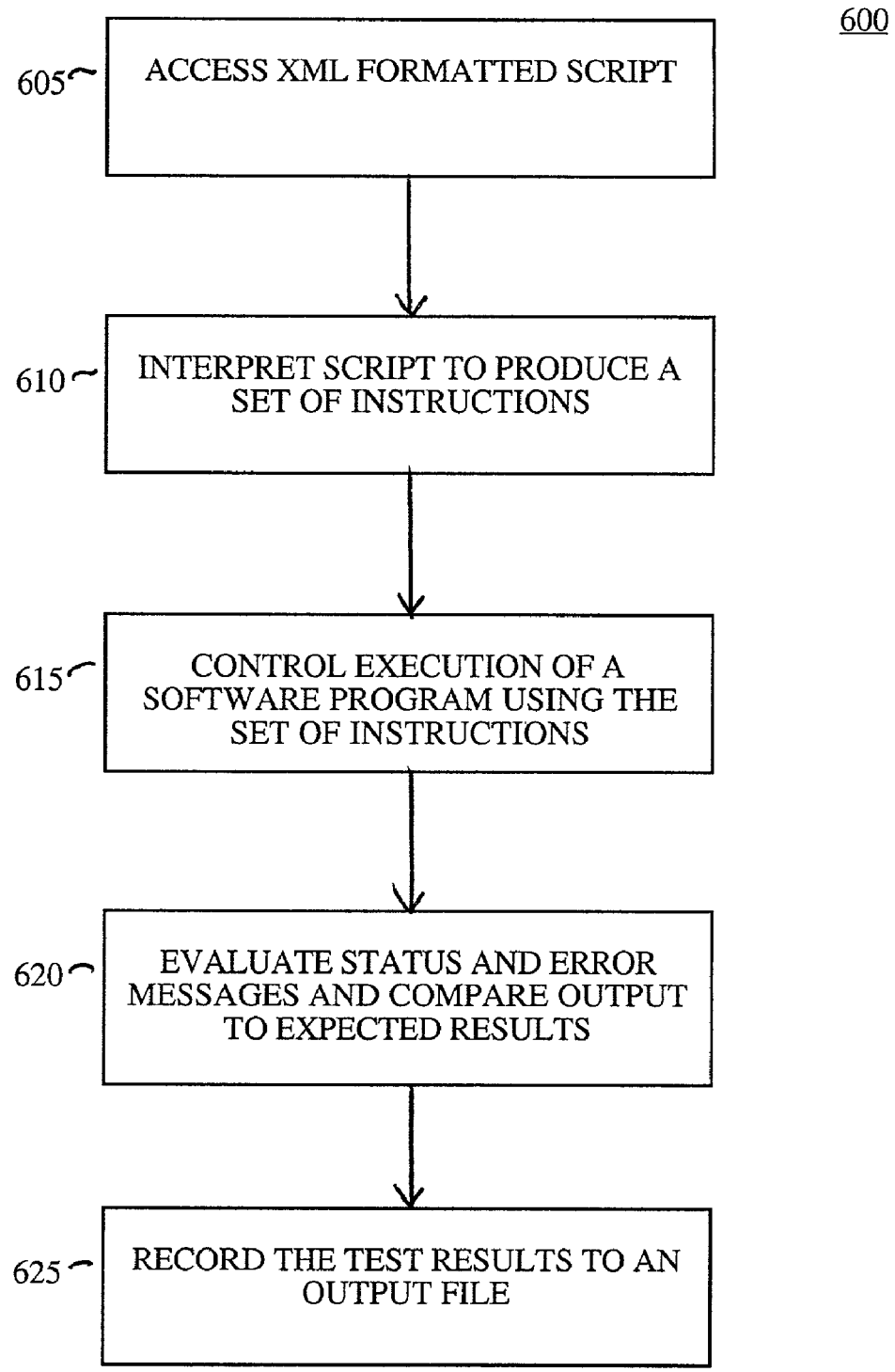
FIG. 6 shows a flowchart for a method of using XML as a scripting language to test a software program in accordance with an embodiment of the present claimed invention.

FIG. 6 shows a computer implemented flowchart 600 for a method of using XML as a scripting language to test a software program in accordance with an embodiment of the present claimed invention.

In step 605, an XML script is accessed by a test control processor which may be implemented as a software tool. XML is used in the script to define a scripting language that is intelligible to the test control processor.

In step 610, The script is interpreted to produce a set of instructions to be applied to the software program that is being tested.

In step 615, the execution of the software program is controlled using the set of instructions generated from the script. Data from the script (or derived from pointers in the script) may also be passed to the software program being tested. In this instance, an automation interface (COM) may be employed to apply the instructions to the application under test In step 620, after the application executes the instructions using internal routines, the test control processor extracts the behavior of the software program. The output of the software program is examined and compared to reference or expected results to check for discrepancies. The reference may be a previously verified ROM file. Error messages and status messages received from the software program may also be evaluated.

In step 625, the test results are captured in an output file. The results may be formatted in XML or HTML as desired. The content and format of one or more output files may vary, depending upon its intended use (e.g., archive or examination). The output file may contain the commands issued to the application, error reports, and the results of comparison checks with expected results.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

The invention claimed is:

1. A computer implemented system for automatically testing software comprising:
   a script formatted in a version of Extensible Markup Language (XML);
   an XML processor for processing said script and producing a set of instructions for execution by a software program; and,
   an output log file for logging results from the execution of said instructions, wherein said instructions comprise instructions for testing said software program, wherein said software program comprises a Component Object Model (COM) interface for providing an interface for receiving said set of instructions.

2. The system of claim 1, wherein said software program comprises an integrated design environment.

3. The system of claim 1, further comprising an XSL stylesheet for rendering said output log file.

4. The system of claim 1, wherein said output log file is formatted in XML.

5. A method for testing a software program comprising:
   accessing a script formatted in a version of Extensible Markup Language (XML);
   interpreting said script with a test control processor to produce a set of instructions;
   controlling the execution of a software program using said set of instructions;
   extracting a behavior of said software program, according to an output rendered thereby; and,
   recording said output in an output file,
   wherein said software program comprises an integrated development environment (IDE).

6. The method of claim 5, wherein said controlling the execution of said software program comprises using a Component Object Model (COM) automation interface.

7. The method of claim 5, wherein said rendering comprises using an XSL stylesheet to render an output log file.

8. The method of claim 7, wherein said output log file is formatted in HTML.

9. The method of claim 5, wherein said controlling comprises generating, compiling, and linking a source code.

10. The method of claim 5, wherein said controlling comprises controlling the execution of a software program using multiple sets of instructions, and further comprising comparing the results obtained from each set of instructions.

11. A computer readable medium containing executable instructions which, when executed in a processing system, causes the system to perform a method comprising:
    accessing a script formatted in a version of Extensible Markup Language (XML);
    interpreting said script with a test control processor to produce a set of instructions;
    controlling the execution of a software program using said set of instructions;
    extracting a behavior of said software program according to an output rendered thereby; and,
    recording said output in an output file,
    wherein said controlling the execution of said software program of said method comprises using a Component Object Model (COM) automation interface.

12. The computer readable medium of claim 11, wherein said software program comprises an integrated development environment (IDE).

13. The computer readable medium of claim 11, wherein said recording of said method comprises:
    accessing an XSL stylesheet; and
    rendering an output log file.

14. The computer readable medium of claim 13, wherein said recording of said method further comprises rendering said output log file in HTML format.

15. The computer readable medium of claim 11, wherein said controlling comprises generating, compiling, and linking a source code.

16. The computer readable medium of claim 11, further comprising instructions for:
    controlling the execution of a software program using multiple sets of instructions; and
    comparing the results obtained from each set of instructions.

17. A computer controlled method for testing comprising:
    accessing a script formatted in a version of Extensible Markup Language (XML) format;
    interpreting said script with a processor to produce a set of instructions;
    applying said set of instructions to an application integrated development environment (IDE) to cause said integrated development environment to execute internal routines which produce information;
    capturing said information into an output file;
    comparing said output file to an expected output file based on said script; and
    generating a result of said comparing.

18. A method as described in claim 17 wherein said IDE is used for producing a design for a programmable microcontroller device.

19. A method as described in claim 17 wherein said application includes a COM Automation Interface.

20. A method as described in claim 17 further comprising using an XSL stylesheet to format said result.

21. A method as described in claim 20 wherein said result is formatted as HTML.

* * * * *